United States Patent [19]
Suzuki

[11] Patent Number: 6,091,579
[45] Date of Patent: Jul. 18, 2000

[54] MEMORY DEVICE WITH IMPROVED MECHANISMS TO POSITION A YOKE

[75] Inventor: Hiroshi Suzuki, Yokohama, Japan

[73] Assignee: Fujitsu Limited, Kawasaki, Japan

[21] Appl. No.: 09/098,091

[22] Filed: Jun. 16, 1998

[30] Foreign Application Priority Data

Oct. 31, 1997 [JP] Japan ............................ 9-300018

[51] Int. Cl.⁷ .................................................. G11B 5/55
[52] U.S. Cl. ................................................... 360/106
[58] Field of Search ........................................ 360/106

[56] References Cited

U.S. PATENT DOCUMENTS

| 5,270,887 | 12/1993 | Edwards | 360/106 |
| 5,581,422 | 12/1996 | Umehara | 360/106 |

FOREIGN PATENT DOCUMENTS

| 6439668 | 2/1989 | Japan . |
| 4302873 | 10/1992 | Japan . |
| 4302874 | 10/1992 | Japan . |
| 6251515 | 9/1994 | Japan . |
| 6309817 | 11/1994 | Japan . |
| 778427 | 3/1995 | Japan . |

*Primary Examiner*—A. J. Heinz
*Attorney, Agent, or Firm*—Greer, Burns & Crain, Ltd.

[57] ABSTRACT

A memory device includes a head arm assembly which is movable in the radial direction. A flat coil is provided at an end of the head arm assembly, with a yoke arranged to surround the flat coil. A magnet is arranged on the yoke to administer a magnetic force to the flat coil. A base has an external circumference wall to form a space to accommodate at least the magnet, a memory medium, the head arm assembly, and the yoke. The base further includes a height setting surface provided near the wall of the drive space to oppose the yoke. The yoke is arranged on the surface by engaging with the surface.

18 Claims, 6 Drawing Sheets

MEMORY DEVICE WITH IMPROVED MECHANISMS TO POSITION A YOKE

The present invention relates to a yoke for a voice coil motor in a memory device, and more particularly to a yoke which is reduced in size and can be used in a small size magnetic disk drive commonly utilized in a mobile computer such as a personal computer or laptop computer.

BACKGROUND OF THE INVENTION

Demand for a mobile computer, such as a personal computer and a laptop computer, has increased rapidly over the years. Consequently, the demand for a small size magnetic disk drive has sharply increased as a memory device for such a mobile computer. Moreover, increases in the recording density of memory devices have caused problems which relate to the positioning accuracy of magnetic heads for disk drives. Further, request for high speed access and low power consumption has caused an intensive demand for highly efficient access motors within the drives.

A flat coil type voice coil motor (VCM) is used generally as the access motor for small size magnetic disk drives. The VCM is structured by vertically stacking an upper and lower yoke of an almost trapezoidal shape, attaching a magnet to at least one piece of the yoke to form a magnetic circuit, and arranging a flat coil of almost the trapezoidal shape between the upper and lower yokes. The coil is provided at one end of a carriage which rotatably holds a plurality of magnetic head arms at the other end.

For practical purposes, a structure of such magnetic circuits is disclosed in Japanese Laid-Open Patent Application Nos. 4-302874, 6-251515 and 7-78427. Japanese Laid-Open Patent Application No. 6-251515, for example, discloses a magnetic circuit where one end of the lower yoke is fixed by a first screw and the other end is fixed by a second screw threaded through the upper yoke and a spacer, to the bottom wall of the drive base. Because the yoke must be positioned accurately, it is crucial that the screw holes of the upper yoke, the lower yoke, and the drive base be positioned accurately. As a result, the manufacturing process can be both difficult and expensive.

Moreover, in the case of mounting the upper yoke using a screw and pin, a height space as much as the head of the screw or pin is necessary between the upper surface of the upper yoke and the drive cover. Therefore, the total size of the magnetic disk drive must be increased, or a design change of the magnetic circuit must compensate for the additional space required by the screw and pin. Accordingly, a part of the yoke must be formed thinner, or the height of the magnetic circuit must be changed, resulting in lower performance characteristics from the motor. Thus, there is a need for a yoke which incorporates a simplified structure having fewer parts and allowing for a decrease in the total size of the disk drive, without affecting the performance of the motor.

Further, Japanese Laid-Open Patent Application No. 7-78427 discloses a base with a circuit having a structure of rectangular holes provided to the lower yoke and rectangular projections provided to the upper yoke. These holes and projections engage each other to position the upper yoke on the lower yoke, without utilizing holes or projection in the base. Because the upper yoke is positioned solely with the lower yoke, the configuration requires high processing accuracy and positional accuracy of the holes of the lower yoke and the projections of the upper yoke, and high fitting accuracy of the drive base and lower yoke.

This configuration mandates clamping a yoke stopper to the side of the upper yoke, to improve the vertical and horizontal positioning accuracies of the upper yoke and lower yoke. Additionally, the structure of the magnetic circuit requires that a damping material be provided between the upper and lower yokes. Therefore, as in the related art above, there exists an increase of cost due to an increase in the number of parts and manufacturing steps necessary to maintain acceptable magnetic circuit characteristics and stable performance. Namely, considerable assembly accuracy and an increased number of parts are required to realize accurate positioning in the vertical and horizontal directions of the upper and lower yokes.

Realizing high speed access of the magnetic heads requires high precision relative to the positional relationship between the magnetic circuit and flat coil. In other words, efficiency of the voice coil motor can be lowered depending on the positioning accuracy in the vertical and horizontal directions of the upper and lower yokes. For example, if the upper and lower yokes are arranged with horizontal deviation, the magnetic effect at the end part of the yokes is lowered, a seeking time for positioning the magnetic disk to the inner most or outer most track of the disk is raised, and the magnetic disk cannot be positioned to the target track due to insufficient power. Thus, there is a need for highly accurate vertical and horizontal positioning of the upper and lower yokes.

Accordingly, one object of this invention is to provide new and improved yokes for memory devices.

Another object is to provide new and improved yokes of reduced size to be used in small magnetic disk drives.

Yet another object of the present invention is to provide new and improved yokes which incorporate a simplified structure consisting of fewer parts and allow a decrease in the total size of disk drives.

Still another object of the present invention is to provide new and improved yokes for voice coil motors in memory devices which assure a required assembly accuracy of the magnetic circuit to enable high speed access of heads.

BRIEF SUMMARY OF THE INVENTION

In keeping with one aspect of this invention, a memory device includes a head arm assembly which is movable in the radial direction. A flat coil is provided at an end of the head arm assembly, with a yoke arranged to surround the flat coil. A magnet is arranged on the yoke to administer a magnetic force to the flat coil. A base of the memory device has an external circumference wall to form a space to accommodate at least the magnet, a memory medium, the head arm assembly, and the yoke. The base further includes a height setting surface provided near the wall of the drive space to oppose the yoke. The yoke is arranged on the height surface by engaging with the height surface.

The positioning accuracy of the upper and lower yokes of the magnetic circuit can be improved by directly engaging at least one of the yoke pieces with the height setting surface of the base. Holes are provided in the base to engage projections provided in at least one of the yokes. The projections are formed in a cylindrical shape, by molding of a plate of the yokes or any other suitable process. Thus, processing can be accomplished easily, and accuracy error due to molding process can be lowered. Hence, an accuracy of the yoke arrangement can be improved with a simplified structure, allowing for efficient assembly of the yokes. Further, such accuracy enables improvement in the speed and positioning performance of the access motor.

Moreover, fixing elements which would otherwise increase the size of the yoke can be eliminated. Since a space between the upper surface of the yoke and a cover is smaller than the height of the projection, there is insufficient play between the upper side of the upper yoke and the cover to allow the upper yoke to disengage from the lower yoke when the cover is in place. Thus, screws and pins utilized by the prior art to fasten the upper yoke can be omitted, to reduce the number of parts and decrease the size of the magnetic circuit.

Further, an elastic material can be provided between the upper surface of the yoke and the lower surface of the cover, to reduce play between the upper yoke and the cover. Use of the elastic material also allows vibration and noise due to the drive of the access motor to be dampened. Further, since the lower yoke is in contact with the base, vertical positioning of the yoke can be established at the height setting surface of the base with high accuracy. The improved accuracy in the arrangement of the yoke results in improved speed and positioning performance of the access motor.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which.

DETAILED DESCRIPTION

Figure 1:
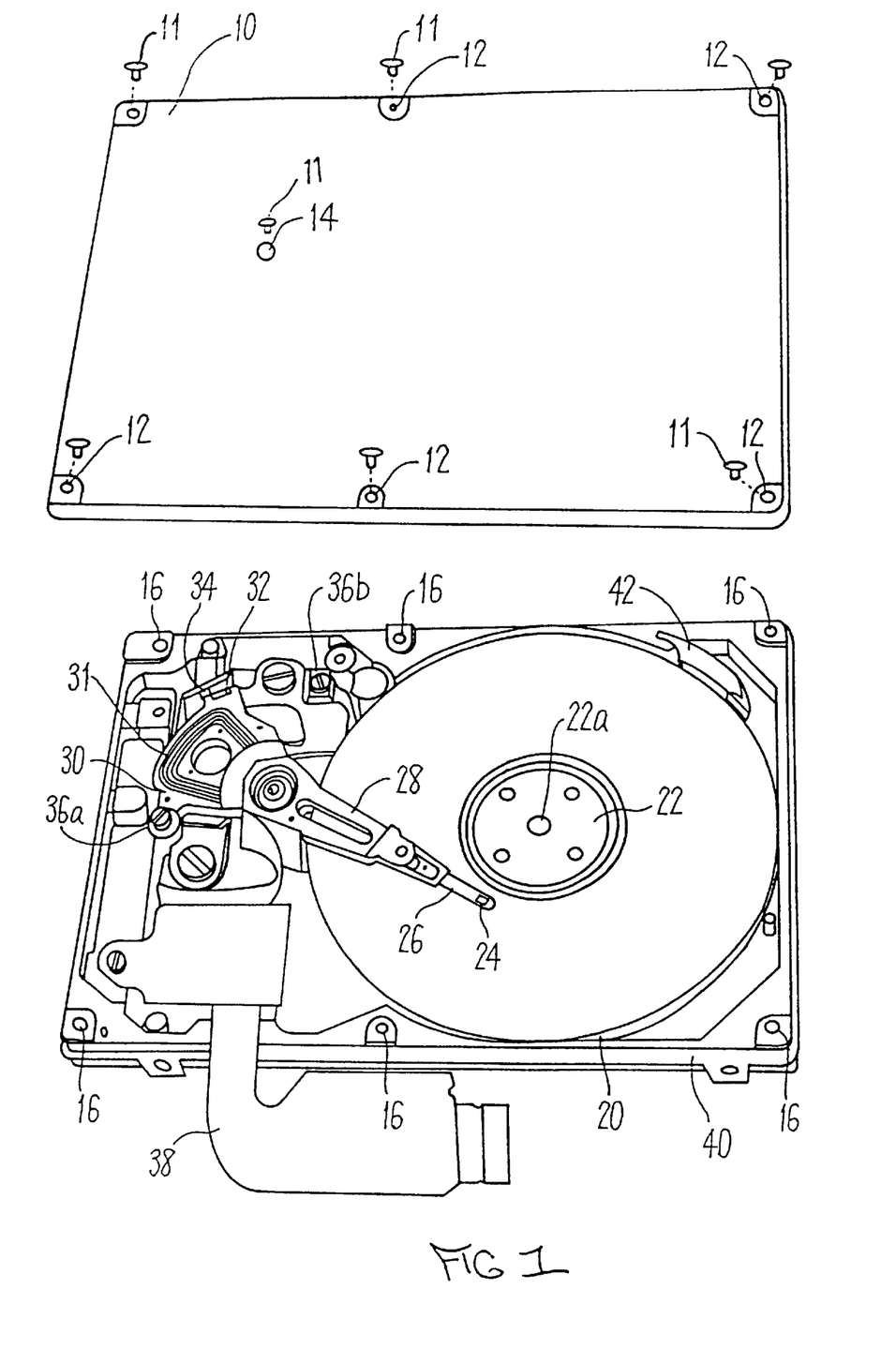
FIG. 1 is a diagram showing an overall structure of the magnetic disk drive of the present invention.

FIG. 1 shows a magnetic disk drive structure for a preferred embodiment of the memory device of the present invention. In FIG. 1, a drive base 40 for mounting the principal elements of the magnetic disk drive is formed of aluminum or aluminum alloy, and the inside of the drive base 40 is hollowed by a diecast molding process to form an accommodation space.

Moreover, screw holes 16 are provided at six points around an external circumference wall. The screw holes 16 of the drive base are aligned with screw holes 12 of the cover 10 to cover and hermetically seal the internal accommodation space of the drive base 40. Further, a screw hole 14 in cover 10 is aligned with a center of a carriage 29 (shown in FIG. 2). Then, after all internal elements are accommodated, screws 11 are applied to each screw hole. Finally, a seal can be adhered to the area surrounding the screw holes 16 and 14, to prevent air from entering through the screw holes.

A spindle motor 22 is provided with, for example, two plates of the magnetic disks 20 which are driven to rotate around the rotating shaft 22a. For two plates of the magnetic disks which are used in both sides, four magnetic heads are used for recording and reproducing operations. Recently, an inductive, composite type magnetic head is employed as the recording magnetic head, and a magnetoresistance effect type magnetic head is utilized as a reproducing magnetic head. In general, a magnetic head is mounted on a magnetic head slider 24.

FIG. 1 further shows the magnetic head slider 24 at the CSS (contact-start-stop) area on the magnetic disk 20. When the magnetic disk is rotated by driving the spindle motor 22, the magnetic head slider 24 receives the air flow of the disk and thereby floats above the magnetic disk by several nanometers. The magnetic head slider 24 is located on a suspension 26 having elasticity. The suspension 26 is located at an end of an actuator arm 28 having rigidity, to move the head slider 24 in the radial direction of the magnetic disk 20.

Moreover, a filter 42 is provided in the internal accommodation space at the external side of the magnetic disk 20. The filter 42 collects dust included in the flow of air by guiding the air flow generated by rotation of the magnetic disk 20 through the filter 42 using the wall of the drive base 40.

Figure 2:
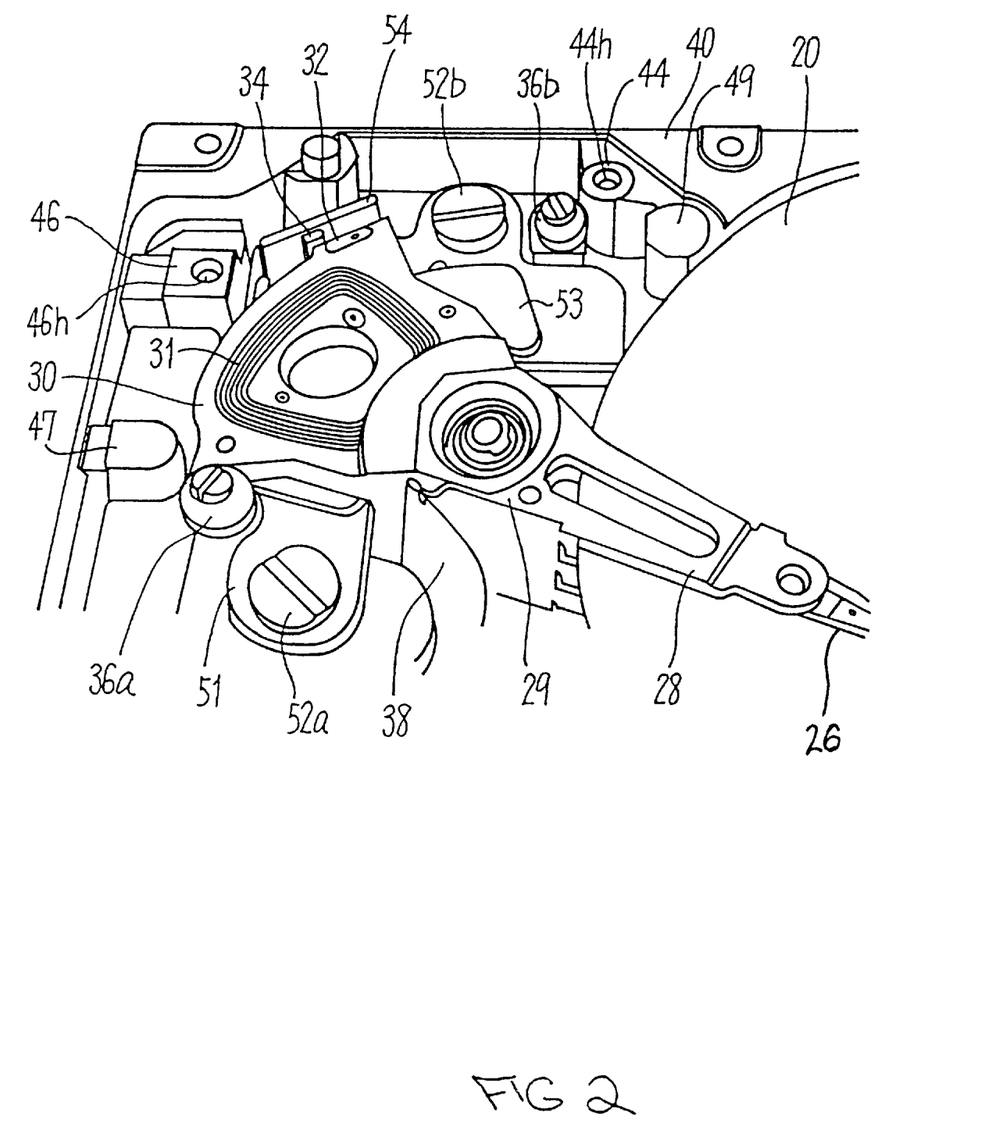
FIG. 2 is a diagram showing an enlarged view of the voice coil motor and a portion of the magnetic disk drive, with the upper yoke removed.

FIG. 2 is an enlarged view of the VCM, with the upper yoke removed. A coil mounting means 30 of a carriage 29 is formed by embedding a coil 31 into a resin material. At an end opposite the actuator arm 28, the coil 31 is loaded to form a part of the VCM, to rotate the actuator arm 28 in the radial direction of the magnetic disk 20. Arranged on the lower yoke 51 are the magnet 53, which faces the lower side of the coil 31. The upper yoke 55 (shown in FIGS. 3 and 4) is arranged at the upper side of the coil 31.

One end of a flexible printed circuit sheet (FPC) 38 for transmitting a recording signal and a reproducing signal to the magnetic head element is connected to a cable pattern formed on the suspension 26, and is connected through the cable pattern to the magnetic head element. The other end of the FPC 38 is connected to a printed circuit board (not illustrated) for holding semiconductor circuits such as an MPU and D-RAM, etc.

The lower yoke 51 is formed by cutting a cold rolled steel plate (SPCC) into a sector shape plate by press technology and then forming a side of the yoke by bending the bending piece 54. The lower yoke 51 is attached to the drive base 40 with the screws 52a, 52b. Moreover, the magnet 53 is affixed to the lower yoke 51 with a magnetic attracting force and a bonding agent.

When the magnetic disk apparatus stops, the magnet 34, provided to the side 54 of the lower yoke 51, affixes the actuator arm 28 in place by attracting and holding an iron piece 32 formed at an end part of the coil loading portion 30. The upper yoke is arranged above the lower yoke 51, and is coupled to the side 54 of the lower yoke 51 with a magnetic attracting force.

At the right and left sides of the coil loading portion 30, stoppers 36a, 36b are provided to specify the moving range of the actuator arm 28 in the radial direction. The stoppers 36a, 36b are structured by a resin ring having elasticity at the part in contact with the coil loading portion 30, and a pin is provided at the center of the ring. The pin is inserted directly into the drive base 40.

At an inside wall of the internal accommodation space of the drive base 40, height setting or level difference surfaces of various shapes 44, 46, 47, 49 are provided. The height setting surfaces 44, 46 are utilized for positioning in order to arrange the upper yoke to the lower yoke 51 with a higher accuracy.

These height setting surfaces 44, 46 are formed to assure sufficient arrangement height of the upper yoke. The surfaces 44, 46 are formed with a high plane accuracy in order to arrange the plane of the upper yoke in parallel with the plane of the lower yoke 51 and the plane of the coil 31. In addition, the level difference surfaces 44, 46 are provided with circular holes 44h, 46h for horizontal positioning, as these holes engage with the cylinder type projections (described later) formed to the upper yoke.

Figure 3:
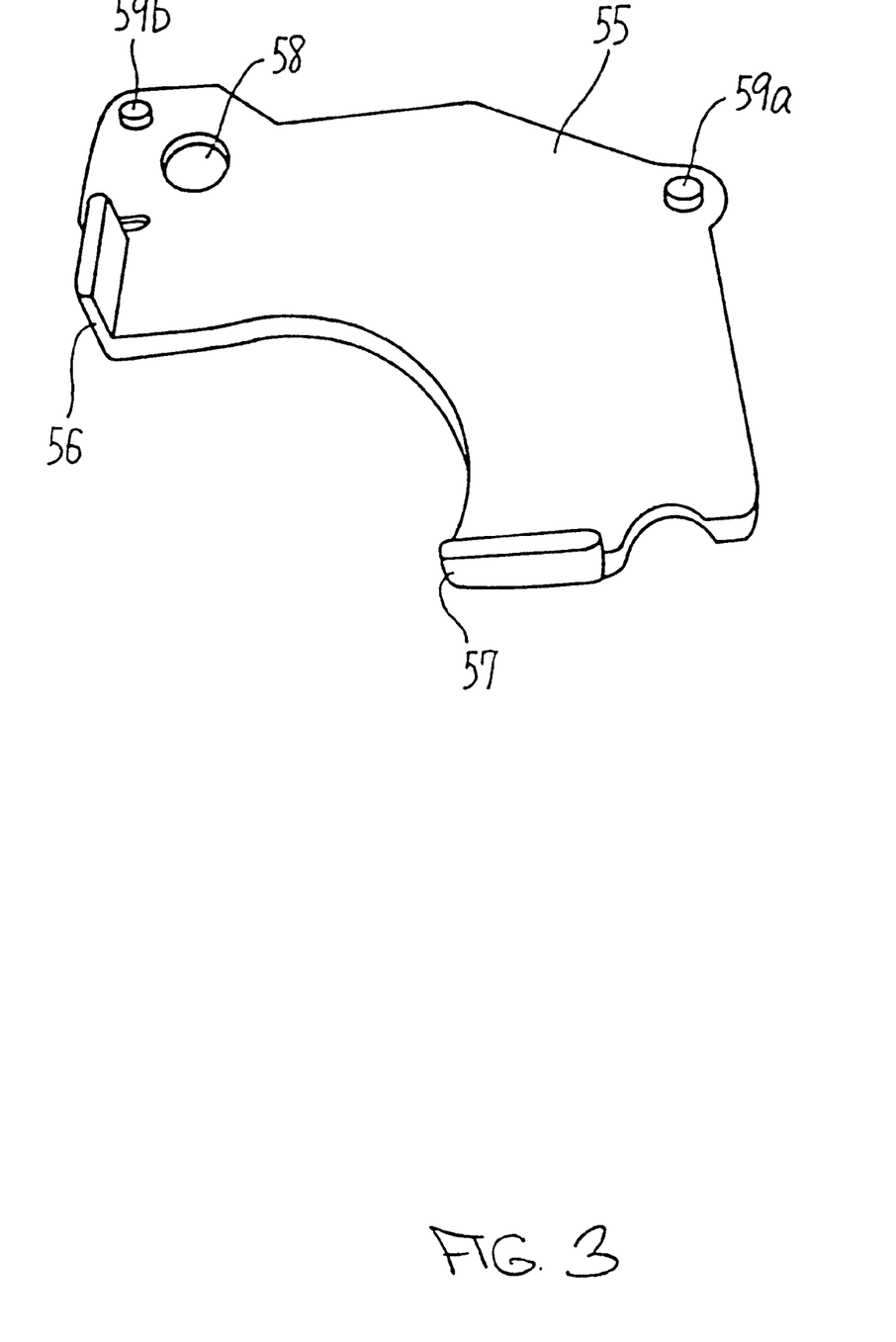
FIG. 3 is a diagram showing an enlarged view of the lower surface side of the upper yoke.

FIG. 3 is an enlarged view of the lower surface side of the upper yoke. The upper yoke 55 is structured by cutting the cold rolled steel plate (SPCC) to the sector shape by press technology, and then forming sides of the yoke by bending the bending pieces 57, 56. Moreover, a hole 58 is formed by the pressing process, as explained above, to escape the head portion of the stopper 36b.

Pushing pins 59a, 59b are formed with the same pressing process as explained above, as cylinder type projections molded by the projected molding method. The pushing pins 59a, 59b are designed to have a circumference which is slightly smaller than that of the corresponding positioning holes 46h, 44h of the drive base 40. Therefore, accurate positioning of the upper yoke 55 can be accomplished by simply engaging the pushing pins 59a, 59b in the positioning holes 46h, 44h.

Here, it is also possible to form the pushing pins 59a, 59b and positioning holes 46h, 44h in a rectangular or square shape, but the circular pin or hole assures higher processing positioning accuracy, making it easier to realize a reduction in assembly steps and automatic assembly, and also to improve productivity. Likewise, while the number of pushing pins, surfaces for positioning, and positioning holes are respectively set at two, one of each may be utilized for positioning, or three or more may be utilized to assure a stable holding. Further, while a projection like the pushing pin is provided to the yoke and a hole is provided to the drive base, it is also possible to provide a hole to the yoke and a projection to the drive base for the engagement between them, to provide the identical effect.

Figure 4:
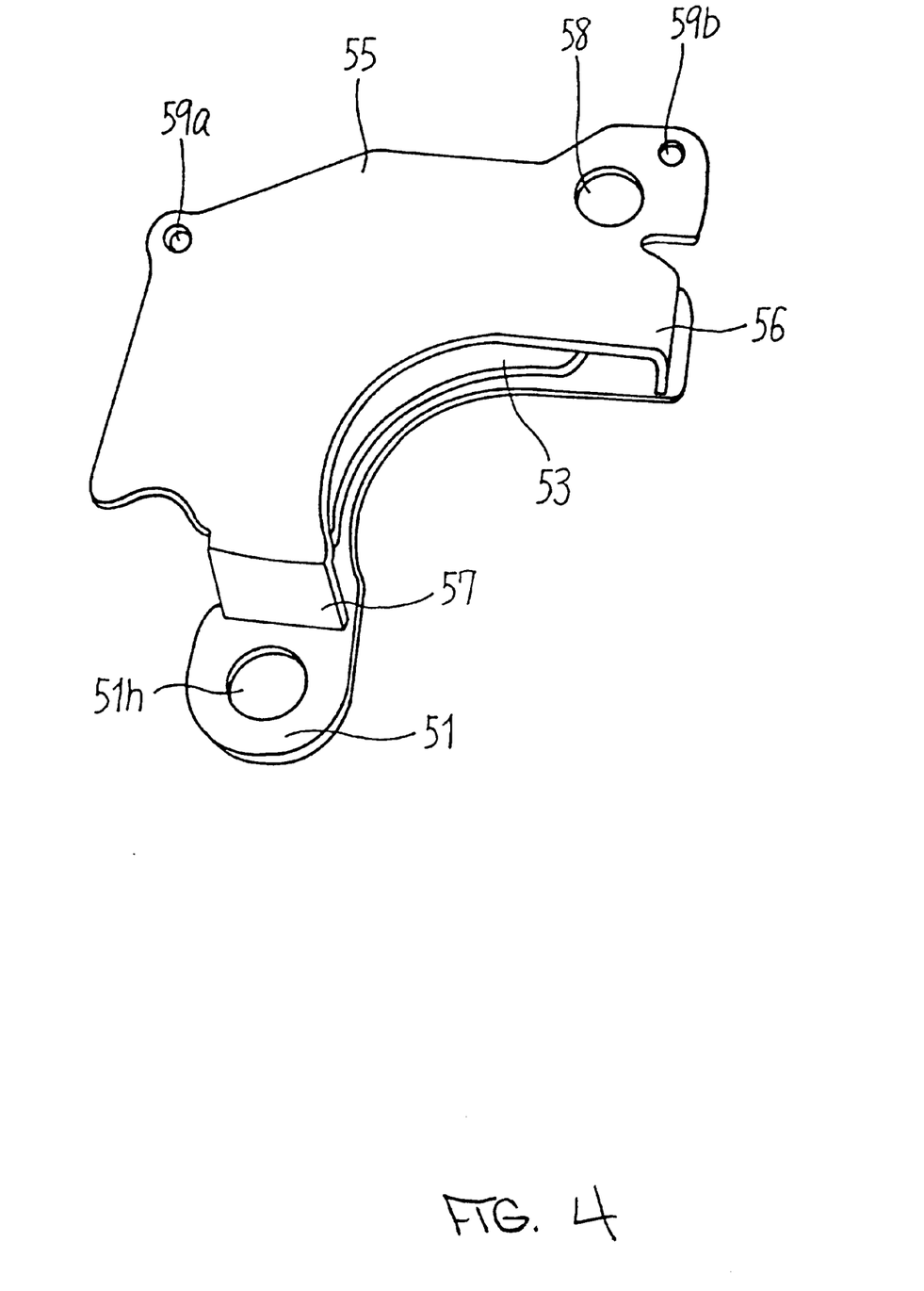
FIG. 4 is a diagram showing the upper and lower yokes stacked.

FIG. 4 shows the upper yoke and the lower yoke in an aligned position. Illustration of the other elements is eliminated to clearly show the arranged relationship. The pushing pins 59a, 59b of the upper yoke 55 are projections as seen from the lower surface of the upper yoke 55, and are holes when seen from an upper surface of the upper yoke 55. Therefore, pushing pins 59a, 59b do not occupy an area above the upper surface, thus minimizing a height of the yoke assembly.

The sides 56, 57 of the upper yoke 55, and the side 54 (not illustrated) of the lower yoke 51 are formed to the same height, to realize accurate positioning in the vertical direction of the upper yoke 55 and the lower yoke 51. The lower yoke 51 is provided with the screw hole 51h to which a screw 52a (shown in FIG. 2) is engaged, and the screw hole (not illustrated) to which the screw 52b (shown in FIG. 2) is engaged. At the center of the lower yoke, a correspondingly shaped magnet 53 is arranged. The coil 31 of the coil loading means 30 is arranged in the space between the upper part of the magnet 53 and the upper yoke 55.

The sides 56, 57 of the upper yoke 55 are coupled to the lower yoke 51 by a magnetic attracting force only, and the side 54 of the lower yoke 51 is also coupled to the upper yoke with only the magnetic attracting force. Accurate positioning in the horizontal directions of the upper yoke 55 and lower yoke 51 is easily accomplished by utilizing the pushing pins 59a, 59b and positioning holes 46h, 44h of the drive base 40, and the mounting accuracy of the lower yoke 51 to the drive base 40.

Accordingly, unlike the related art explained above, positioning is not executed by utilizing a rectangular projection provided to the upper yoke, with the rectangular projection being inserted into the corresponding rectangular hole of the lower yoke. In this embodiment, both the upper yoke 55 and the lower yoke 51 utilize the drive base 40 to achieve their respective positions. Since the drive base 40 can be manufactured by diecast molding of aluminum or aluminum alloy, which may be cut easily, one can easily obtain a desired surface accuracy and positional accuracy. In other words, the positioning accuracy in the vertical and horizontal directions of the upper yoke 55 and lower yoke 51 can be improved by setting the positioning reference of the upper yoke 55 and the lower yoke 51 directly to the drive base 40.

Figure 5A:
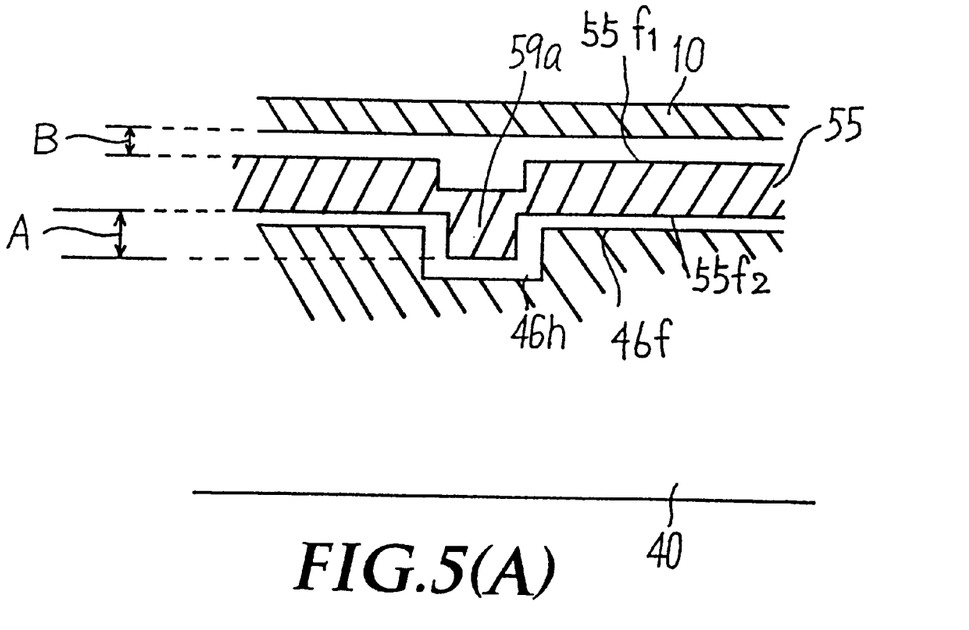
FIG. 5(A) is a diagram showing the arrangement relationship of the yokes and the cover.

FIG. 5(A) shows the arrangement of the yokes. Here, the pushing pin 59a of the upper yoke 55 is engaged with the positioning hole 46h of the drive base 40. In the case of this embodiment, the lower surface 55f2 of the upper yoke 55 is not in contact with the surface 46f of the surface 46 (shown in FIG. 2) for positioning on the drive base 40. In other words, lower surface 55f2 is arranged in the floating condition to maintain a gap between surfaces. Namely, since positioning in the vertical direction of the upper yoke 55 and the lower yoke 51 is determined by the height of the side 54 of the lower yoke 51, and sides 56, 57 of the upper yoke 55, the lower surface 55f2 of the upper yoke 55 is not in contact with the surface 46f of the surface 46 on the drive base 40.

Importantly, even when the position of the pushing pin 59a formed by the press is not highly accurate, namely the pin 59a is formed a little deviated from the center of the hole, sufficient engagement can be realized because the size of the positioning hole 46h is larger than the size of the pin 59a. Therefore, in this embodiment, the magnetic circuit can be adequately positioned without mandating the high accuracy required by the related art for positioning the structure of the magnetic circuit.

The upper yoke 55 is held by the lower yoke 51 with the magnetic attracting force received from the sides 54, 56, 57 of the yokes 55, 51 as explained above, and the upper yoke 55 can move when an impact occurs to an external side of the device. Accordingly, as shown in FIG. 5(A), an interval B between the internal surface of the cover 10 and the upper surface 55f1 of the upper yoke 55 is set smaller than the interval A between the lower surface 55f2 of the upper yoke 55 and an end of the pushing pin 59a. Therefore, at least the end part of pushing pin 59a remains constantly engaged with hole 46h. Since the gap between the upper yoke 55 and the cover 10 is set so that the pushing pin 59a does not disengage with hole 46h, the upper yoke 55 is reliably held in place without the need for screws which would otherwise cause the size of the yoke to increase.

Figure 5B:
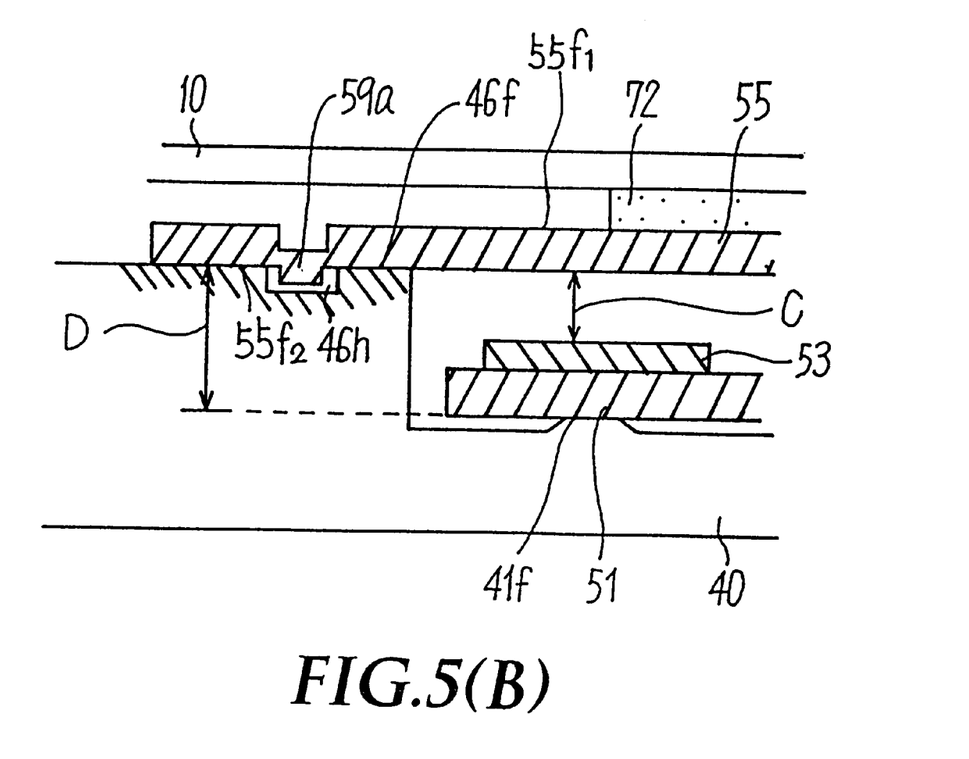
FIG. 5(B) is a diagram showing a second embodiment of the arrangement relationship of the yokes and the cover.

FIG. 5(B) shows a second embodiment of the yoke arrangement relationship. In FIG. 5(B), the lower surface 55f2 of the upper yoke 55 is in contact with the surface 46f of the surface 46 positioned on the drive base 40 to reserve an interval (core gap) C in the vertical direction for the magnet 53 on the lower yoke 51. In order to improve the arrangement accuracy of the lower yoke 51, the lower yoke 51 is positioned on the surface 41f. The surface 41f has the desired height setting surface accuracy to obtain the dimension D, the distance between a lower surface of the lower yoke 51 and a lower surface of the upper yoke 55.

Processing of the height setting surfaces 41f, 46f, for positioning to the desired surface height accuracy, can be easily accomplished by utilizing a diecast molding or cutting process. In addition, the other level difference surface explained above can also be processed in the same manner to improve the surface height accuracy.

Moreover, in FIG. 5(B), an elastic material 72, for example, VEM (vibration absorbing material) produced by 3M Corporation, is sandwiched between the lower surface of the cover 10 and the upper surface 55f1 of the yoke 55. Therefore, excessive vertical movement of the upper yoke 55 can be prevented. Further, employment of the elastic material 72 enables absorption of vibration and noise generated when the VCM is driven.

Figure 6:
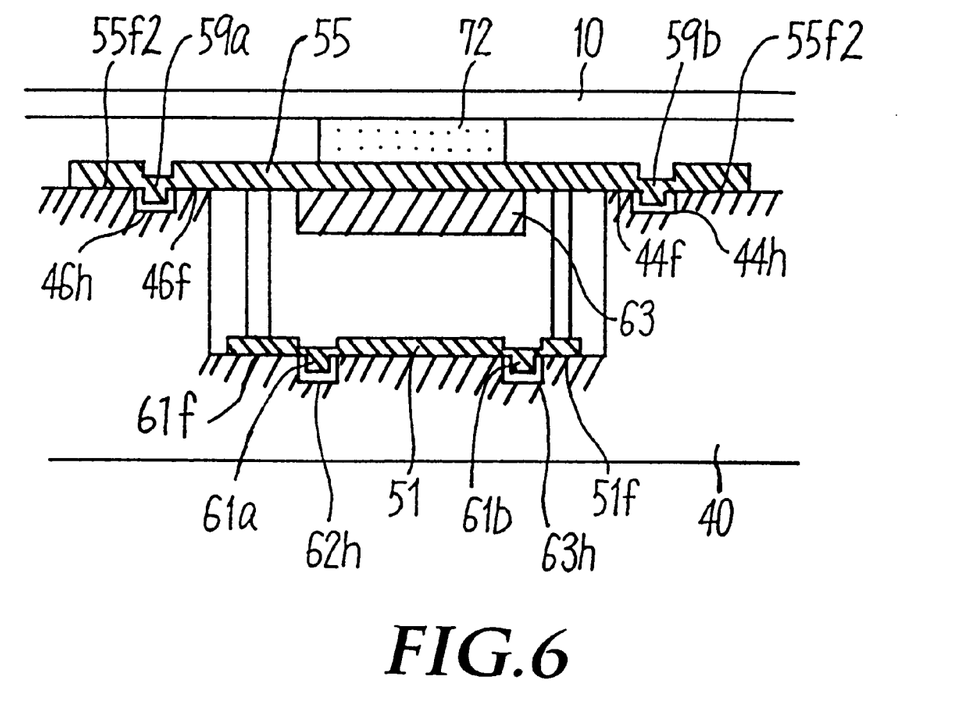
FIG. 6 is a diagram showing a third embodiment of the magnetic circuit.

FIG. 6 shows a third embodiment of the magnetic circuit. In FIG. 6, a magnet 63 is arranged on the upper yoke 55. Pushing pins 61a, 61b are provided on the lower yoke 51 and the positioning holes 62h, 63h are provided in the surface 61f of the drive base 40 at corresponding positions.

Similar to the explanation above for FIG. 5(B), the vertical positioning of the upper yoke 55 is executed by placing the lower surface 55f2 of the upper yoke 55 in contact with the surfaces 46f, 44f of the surface 46 for positioning on the drive base 40. In the same manner, the vertical positioning of the lower yoke 51 is executed by placing the lower surface 51f of the lower yoke 51 in contact with the surface 61f for positioning on the drive base 40. In addition, the structure of the magnetic circuit other than that explained above is identical to that shown in the first embodiment of FIG. 1, and the same explanation is not repeated here.

Therefore, in all of the embodiments, it is an advantage of the present invention that vertical and horizontal positioning can be realized accurately by simply positioning the upper and lower yokes with the pushing pins and the holes of the drive base 40. Accordingly, fixing elements, such as screws, are not required. Thus, the size of a disk drive may be reduced since the size of a yoke may be reduced by not requiring screws to position the upper yoke. Further, the vertical and horizontal positioning accuracy of yoke can be improved through the use of a simplified structure, and therefore the speed and positioning characteristic of the access motor can also be improved. Another advantage of this invention is that the driving force of the access motor can be stabilized to attain effective use thereof to realize low power consumption. In addition, since the accurate arrangement of the yoke can be assembled with a simplified structure, positioning can be accomplished easily to enable quick and automatic assembling.

While the principles of the invention have been described above in connection with specific apparatus and applications, it is to be understood that this description is made only by way of example and not as a limitation on the scope of the invention.

What is claimed is:

1. A memory device comprising:
   a head arm assembly with a head on one end which may be held movable in the radial direction of a recording medium;
   a flat coil provided at another end of said head arm assembly;
   a yoke arranged to surround said flat coil, said yoke having upper and lower yoke pieces;
   a magnet arranged on at least one of said yoke pieces to effectuate magnetic force to said flat coil;
   a base having an external circumference wall to form a space to accommodate at least said memory medium, said head arm assembly, and said yoke;
   a cover which is secured to said base to cover said upper yoke and enclose the memory device,
   said base further having a surface integrally formed with said base for for positioning said upper yoke piece to set the height of said yoke in the memory device;
   attachment means for attaching said lower yoke piece to said base; and
   engagement means for engaging said upper yoke piece to the surface of said base in the memory device, said engagement means restricting substantial lateral movement of said upper yoke piece without vertically fixing said upper yoke piece to said lower yoke piece.

2. A memory device according to claim 1 wherein said upper yoke piece further is fixed to said lower yoke piece by magnetism only.

3. A memory device according to claim 1 wherein an elastic material is arranged between the upper surface of said upper yoke piece and said cover.

4. A memory device according to claim 1 wherein said engagement means includes a projection, an interval between the upper surface of said yoke and said cover being smaller than the height of said projection.

5. A memory device according to claim 4 wherein said projection is a cylinder type projection.

6. A memory device according to claim 5 wherein said projection is formed through projected molding of said yoke.

7. A memory device according to claim 6 wherein a surface surrounding the projection of said yoke is in contact with the surface of said base.

8. A memory device according to claim 6 wherein an elastic material is arranged between the upper surface of said yoke and said cover.

9. A memory device according to claim 8 wherein the plate surface surrounding the projection of said yoke is in contact with the surface of said base.

10. A memory device according to claim 5 wherein an elastic material is arranged between the upper surface of said yoke and the cover.

11. A memory device according to claim 5 wherein the plate surface surrounding the projection of said yoke is in contact with the surface of said base.

12. A memory device according to claim 1 wherein said engagement means includes a hole provided in said height setting surface of said base, and a projection on said yoke which fits into said hole.

13. A memory device according to claim 12 wherein an interval between the upper surface of said yoke and a cover is smaller than the height of said cylinder type projection.

14. A memory device according to claim 12 wherein an elastic material is arranged between the upper surface of said yoke and the cover.

15. A memory device according to claim 12 wherein the plate surface surrounding the projection of said yoke is in contact with the surface of said base.

16. A memory device according to claim 12 wherein said projection is formed through projected molding of the plate of said yoke.

17. A memory device according to claim 1 wherein said upper yoke piece directly engages said base with a first said engagement means and said lower yoke piece directly engages said base with a second said engagement means.

18. A memory device according to claim 1 wherein said engagement means is positioned entirely below a top surface of said upper yoke piece so that said engagement means avoids an area between said upper yoke piece and said cover.

* * * * *

UNITED STATES PATENT AND TRADEMARK OFFICE
CERTIFICATE OF CORRECTION

PATENT NO.   : 6,091,579
DATED        : July 18, 2000
INVENTOR(S)  : Hiroshi Suzuki

It is certified that error appears in the above-indentified patent and that said Letters Patent is hereby corrected as shown below:

In the Claims:

Claim 1, Column 8, line 4, please delete the first occurrence of "for".

Signed and Sealed this

Twenty-fourth Day of April, 2001

Attest:

NICHOLAS P. GODICI

Attesting Officer   Acting Director of the United States Patent and Trademark Office